United States Patent

[11] 3,590,351

| [72] | Inventor | Arthur K. Littwin<br>2235 N. Knox Ave., Chicago, Ill. 60639 |
|---|---|---|
| [21] | Appl. No. | 835,578 |
| [22] | Filed | June 23, 1969 |
| [45] | Patented | June 29, 1971 |

[54] MOTOR CONTROL, INCLUDING BRAKE APPLYING, AND SUPPRESSING OF THE COUNTER EMF, AND METHOD
10 Claims, 1 Drawing Fig.

[52] U.S. Cl. .................................................. 318/211,
318/229, 318/380, 318/430, 318/434, 318/492,
317/13, 317/20
[51] Int. Cl. .................................................. H02p 3/22
[50] Field of Search .......................................... 318/228,
229, 211, 380, 430, 434, 492; 317/13, 20, 11.2

[56] References Cited
UNITED STATES PATENTS

| 1,215,184 | 2/1917 | Pauly ............................ | 318/211 |
| 1,625,464 | 4/1927 | Gay .............................. | 317/11 |
| 2,774,023 | 12/1956 | Griffes ........................ | 318/211 X |
| 2,975,346 | 3/1961 | Ludbrook ..................... | 318/211 X |
| 3,153,182 | 10/1964 | Choudhury ................... | 318/211 |

*Primary Examiner* — Oris L. Rader
*Assistant Examiner* — Gene Z. Rubinson
*Attorney* — Paul H. Gallagher ABSTRACT: Includes resistors and circuitry for connecting them across the motor winding, means holding the circuitry open during normal operation of the motor, a STOP switch for stopping the motor, and means operative on actuation of that switch for connecting the resistors in the circuitry, and thereafter opening the motor drive circuit, whereby the counter e.m.f. is directed through the resistors.

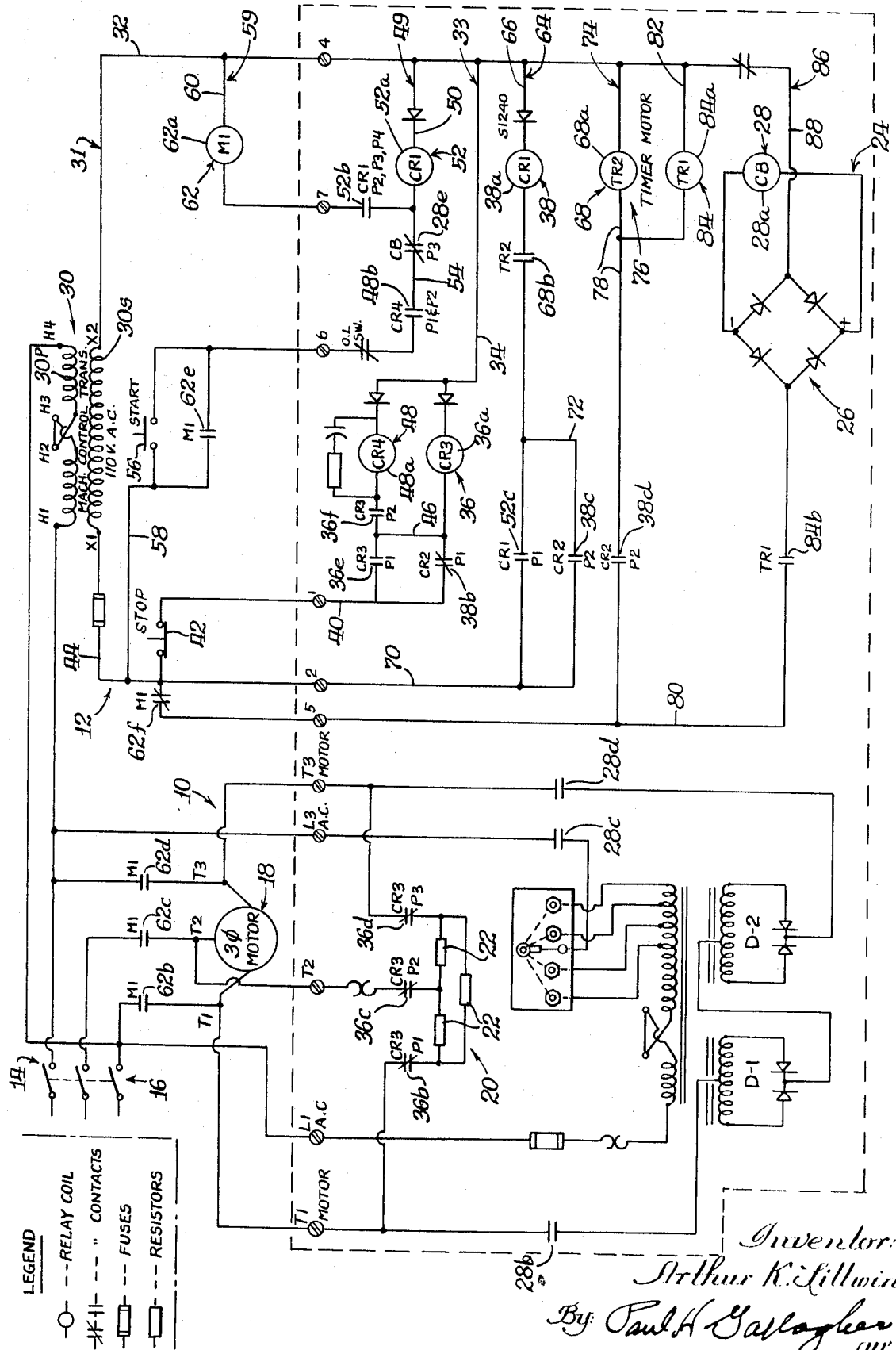

3,590,351

MOTOR CONTROL, INCLUDING BRAKE APPLYING, AND SUPPRESSING OF THE COUNTER EMF, AND METHOD

FIELD OF THE INVENTION

This invention relates to electrical motors but finds applicability most generally to three phase motors because the larger motors where the counter e.m.f. is greater are most often of three phase type. Extremely large counter e.m.f. is produced upon opening the drive circuit to the motor. The high voltages encountered are much greater than the voltages persisting in the normal operation of the motor, and they cause severe damage puncturing the insulation in the motor windings as well as damaging or destroying rectifiers used in the motors. The damage is particularly serious in the case of larger motors, such for example as those of between 100 and 250 horsepower.

OBJECTS OF THE INVENTION

A broad object of the invention is to provide novel suppressor means, and method of utilizing it, in a motor for preventing damage to the motor, such as by puncturing the insulating on the winding, or destroying rectifiers.

Another object is to provide in a motor, means for suppressing counter e.m.f. occuring in opening the circuit to the drive of the motor, in a novel arrangement whereby the voltage is dissipated through the suppressor means without damage to any parts of the motor.

Another and more specific object is to provide suppressor means in an arrangement of the kind just referred to in which the suppressor means is interconnected in circuit in the motor before the drive circuit is opened, whereby to assure the connection of the suppressor means in the motor before the drive circuit is open.

Another and still more specific object is to provide suppressor means in a motor, of the general character referred to above, and including a novel control circuit in the use of which, in the normal operation of the motor, the suppressor means is automatically disconnected from the motor, and upon opening the drive circuit to the motor, the suppressor means is automatically put in circuit, and shortly thereafter and as a sequential step in the automatic operation, the drive circuit is interrupted, whereby the suppressor means is not incorporated in the circuitry of the motor during the normal operation thereof, and it is only immediately before the drive circuit is opened that it is brought into effective connection, and as a necessary step in the automatic control, the drive circuit to the motor is opened immediately after the suppressor means is connected.

A still further object is to provide suppressor means in a motor in conjunction with brake means in a novel control circuit wherein a series of steps are performed in a necessary sequence in the automatic operation thereof, wherein while the motor is operating under the control of a drive circuit, first the suppressor means is connected in circuit across the motor winding, then the drive circuit to the motor is interrupted, then the brake is applied to the motor, and finally the brake cycle is terminated, releasing the brake.

A further object of the invention is to provide a new method of suppressing counter e.m.f. in a motor.

DESCRIPTION OF A PREFERRED EMBODIMENT

In the drawings:

The single FIG. is a diagram of the complete circuit for controlling the motor, including the suppressor means and the circuitry for controlling it, according to the invention.

Referring in detail to the circuit of the drawings, the circuit includes two main portions, a motor circuit 10 and a machine control circuit 12. The complete circuit derives its power from a suitable three phase AC line 14, the latter having a suitable main switch 16. The motor to be controlled is shown at 18, and the suppressor means is indicated generally at 20, including resistors 22 connected across the motor winding.

All relays appearing in the circuit are identified by main reference numerals, the coils thereof by the same reference numerals with the subscript $a$, and the various contacts also by the same reference numerals and consecutive subscripts such as $b$, $c$, $d$, etc. In a similar manner transformers are identified by main reference numerals, the primaries thereof by the same reference numerals followed by the subscript P and the secondaries by the same reference numerals and subscript S.

Brake means of known kind is utilized for braking the motor, but is not included as such in the circuit, but represented by a brake circuit 24 deriving its power from a rectifier 26 included in the control circuit 12. Operatively associated with the brake circuit 24 is a relay 28 having a coil 28a in the brake circuit and contacts 28b, 28c, 28d in the motor circuit 10 and other contacts 28e in the machine control circuit 12 (upper right) as will be referred to again hereinbelow. The particular kind of brake means and the control therefor do not in themselves enter into the invention except that the timing of the application of the brake is interconnected in the suppressor control as will be referred to hereinbelow.

The machine control circuit 12 derives its power through a transformer 30 having a primary 30P connected with the line 16 and a secondary 30S in the circuit 12 itself. Upon closure of the main line switch 16, and before any manipulation for the purpose of utilizing the suppressor of the invention, a subcircuit 31 is energized as follows: leading from the secondary 30S, through a conductor 32, a conductor 34, relay coil 36a, relay contacts 38b, conductor 40, STOP switch 42, and conductor 44, in return to the secondary 30S. The coil 36a being thus energized, the normally closed contacts 36a, 36c, 36d (upper left) in the motor circuit are opened, disconnecting the suppressor means 20 from the motor winding. The relay coil 36a also closes contacts 36e and 36f, the contacts 36e establishing holding circuit for relay 36 through conductor 46. Contacts 36e, 36f establish circuit through relay 48, coil 48a thereupon closing contacts 48b (upper right) conditioning another subcircuit 49 for applying the suppressor and stopping the motor; this subcircuit 49 includes the conductor 32 from one side of the secondary 30S, a conductor 50, a relay 52, conductor 54 which includes the normally closed contacts 28e and abnormally closed contacts 48b, a START switch 56, conductor 58, conductor 44, in return to the secondary.

Still another subcircuit 59 includes a conductor 60 leading from the conductor 32, and in which is a relay 62 (top right) and contacts 52b. The conductor then connects with conductor 50 and is conditioned along with the subcircuit 49.

The circuit is thus conditioned for completion, and thereby driving the motor, upon depression of the START switch 56 (top right). This closure of the START switch completes the subcircuit 49, through the relay 52, and the energization of the corresponding coil 52a closes the contacts 52b in the subcircuit 59 which thus completes the latter subcircuit through the relay 62. Energization of this relay closes the contact 62b, 62c, 62d (top left) in the motor circuit and connects the drive to the motor. At the same time contacts 62e (upper right) are closed establishing a holding circuit through relays 52, 62. Additionally contacts 62f (upper center) are opened.

The overall circuit is thereby completed for driving the motor and the motor continues to be driven until further steps are to be taken, and applying the suppressor means and braking the motor. For this purpose the STOP switch 42 (upper center) is actuated, interrupting the subcircuit 31, this subcircuit having been closed throughout the normal operation of the motor. Opening this subcircuit 31 deenergizes the relay 36 and allows the contacts 36b, 36c, 36d (upper left) to close, completing circuit through the suppressor means and connecting it across the motor winding. In this step the contacts 36e, 36f (upper right) are opened, opening the circuit to the relay 48, and the contacts 46b (upper right) are again opened.

This opens the subcircuit 59, deenergizing the relay 62 and thereupon opening the motor drive contacts 62b, 62c, 62d (top left). However it is to be noted that the opening of these motor drive contacts occurs only after the closure of the suppressor contacts 36b, 36c, 36d, and after an interval of dwell, namely deenergizing relay 36 and substantially simultaneously therewith closing the suppressor contacts, and thereafter and as a distinct subsequent step, the deenergization of the relay 48 and consequent opening of the contacts 48b in the subcircuit 49, and it is only after opening of the latter contacts that the relay 62 is deenergized to permit opening of the motor drive contacts. Accordingly the suppressor means remains disconnected throughout the complete normal operation of the motor, and is connected only when the motor is to be braked, and immediately before the drive circuit is opened, and before the brake is applied.

Still an additional subcircuit 64 is provided in the machine control circuit 12, which includes a conductor 66 leading from the conductor 32, and including the relay 38 and contacts 68b of a timer relay 68 of known kind, referred to again hereinbelow; it further includes the contacts 52c and is connected with another conductor 70 which leads to the conductor 44. An additional conductor 72 is connected with the conductor 66 and includes contacts 36c and leads to the conductor 70.

The application of the suppressor means is automatically interconnected with the application of the brake means normally associated with a motor of this type. For this purpose an additional subcircuit 74 is provided, which includes timer motor means indicated at 76 and includes a conductor 78 leading from the conductor 32 and including the relay 68. The conductor also includes contacts 38d and leads to another conductor 80 which includes the contacts 62f (upper center) and is connected to the conductor 44. The subcircuit 74 additionally includes another conductor 82 which in turn includes the coil 84a of a timer relay 84 and is connected with the conductor 78.

Finally the conductor 32 leads to a still further subcircuit 86 including a conductor 88 in turn including the rectifier 26 which is also included in the brake subcircuit 24 as referred to above. The conductor 88 also includes contacts 84b.

In starting the motor i.e. upon closure of the START switch 56 (upper right) the contacts 52c (right center) are closed upon energization of the subcircuit 49 and relay 52 (right center). This completes the subcircuit 64 which is held by the contacts 38c. Energization of the coil 38a in the subcircuit closes contacts 38d (lower right) and conditions the subcircuit 74 for completion upon closure of the abnormally open contacts 62f (upper center), the timer means motor i.e. the relays 68 and 84 thus remaining deenergized. However in stopping the motor, the relay 62 (upper right) is deenergized, as explained above, and the contacts 62f (upper center) are closed, completing the circuit through the timer motor means. This timer motor means provides for the desired delay in applying the brake after the STOP switch is actuated and for timing the brake cycle. For this purpose the timer relay 84 is set, or preselected, for providing a suitable delay such as a half second, a full second, etc. whereupon it becomes energized and closes the contacts 84b (bottom right) and closes the brake subcircuit 24 which applies the brake in a known manner. It will be appreciated that this brake is thus applied only after that interval mentioned following closure of the contacts 62f which of course is simultaneous with the opening of the motor drive contacts 62b, 62c, 62d (top left). The timer relay 68 is preset, or preselected, according to a longer period, namely that required for applying the brake to the motor, and it may be for example 30 seconds, or other time according to the characteristics of the motor. The relay 38 is arranged for terminating the application of the brake, after the desired interval, such as 30 seconds, etc. according to characteristics of the motor, as are known. For this purpose the relay 68 also remains deenergized until the expiration of that period, and at that time becomes energized, opening contacts 68b (right center) deenergizing the relay 38 which in turn deenergizes contacts 38d (lower right) and these contacts in turn deenergize the timer motor means 76, and the relay 84 thereof being thus deenergized, permits the contacts 84b (bottom right) to open, deenergizing the brake subcircuit 24.

Thus the complete control of the motor is integrated into a series of steps automatically interconnected: (1) connecting the suppressor means, (2) after a dwell, opening the circuit to the motor, (3) thereafter and after a dwell, applying the brake means, and finally (4) after another dwell opening the brake circuit.

I claim:

1. Control means for an electrical motor having a winding, comprising,
   a. a first circuit for driving the motor,
   b. resistor means,
   c. a second circuit for connecting the resistor means across the motor winding,
   d. brake means for stopping the motor and electrically controlled means for applying the brake means,
   e. switch means for closing the second circuit of (c) for thereby connecting the resistor means across the motor winding,
   f. time delay means controlled by the switch means of (e) and operative following a predetermined period of time after actuation of that switch means for opening the first circuit of (a),
   g. means for applying the brake means of (d).

2. Motor control means according to claim 1 and including means operative in response to actuation of the switch means of (e) for applying the brake means following a predetermined period after actuation of that switch means.

3. Motor control means according to claim 1 wherein,
   the first circuit includes a plurality of normally opened relay contacts,
   the second circuit includes a plurality of normally closed contacts, the control means including subcircuit means including a START switch and relay means for controlling the normally open relay contacts in the first circuit, and operative in response to actuation of a start switch for closing those contacts.

4. Control means according to claim 3 wherein,
   the circuit means includes main switch means, and it includes subcircuit means normally energized upon closure of the main switch means, operative when energized for retaining the normally closed relay contacts in the second circuit in open condition, and
   STOP switch means in the subcircuit operative in response to actuation thereof for deenergizing said relay means and enabling the relay contacts in the first circuit to open and the relay contacts of the second circuit to close.

5. Control means according to claim 4 wherein the relays for closing the relay contacts in the second circuit are arranged in circuit with the relays for controlling the relay contacts in the first circuit, whereby the second circuit is operative for connecting the resistors across the motor winding before the first circuit for driving the motor is opened.

6. Motor control means according to claim 5 and including,
   time delay means for controlling the brake means whereby to apply the brake means after the expiration of the predetermined time interval, and
   means controlled by the STOP circuit for energizing the brake control means whereby the brake is applied after the expiration of said time limit.

7. Motor control means according to claim 6 wherein,
   the time delay means includes a timer motor incorporating relay means operative for actuating its contacts after the expiration of said time interval, and the stop circuit includes a stop switch energizing the timer motor.

8. Motor control means according to claim 7 wherein,
   the means for opening the motor drive contacts and for operating the brake means are actuated simultaneously by a common control element whereby a time interval transpires between the opening of the motor drive contacts and the application of the brakes.

9. Motor control means according to claim 8 and including, time delay means for interrupting application of the brake means following a predetermined period of time after application of the brake means.

10. A method of controlling an electrical motor, having a winding, after normally driving the motor and including the steps:

a. applying suppressor means across the winding of the motor, b. after step (a) and as a consequence of that step, opening the drive to the motor, c. applying a brake to the motor as a direct consequence of step (a) but after a predetermined time interval, and d. as a consequence of step (a), and following a predetermined time interval after step (c) takes place, releasing the braking force applied to the motor.